Dec. 12, 1939.    A. SKOK ET AL    2,183,411
AUTOMATIC OSCILLATING AND ROTARY AIR CONTROLLER FOR
INTERNAL COMBUSTION ENGINES AND THE LIKE
Filed Jan. 20, 1938
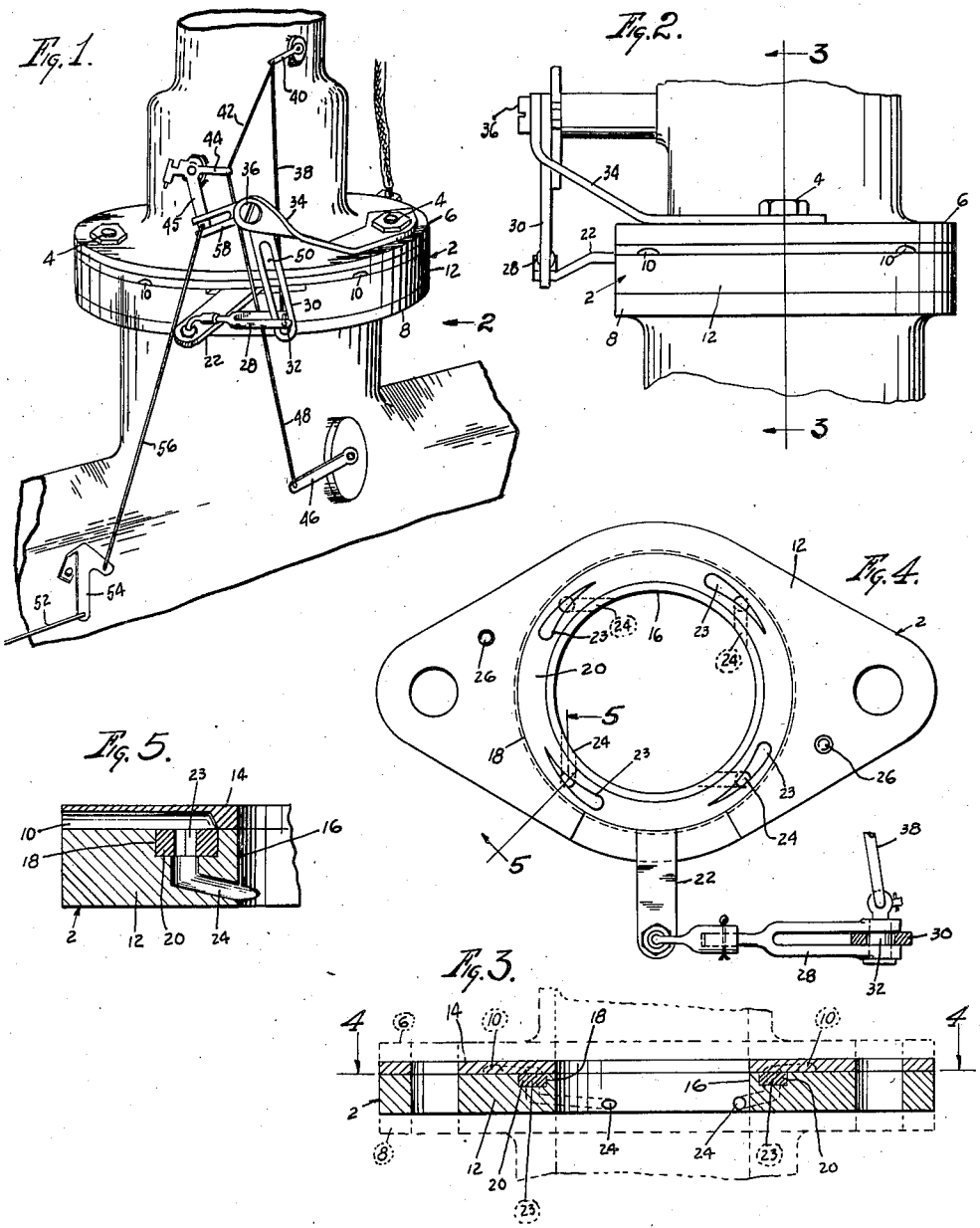

Patented Dec. 12, 1939

2,183,411

UNITED STATES PATENT OFFICE 2,183,411

AUTOMATIC OSCILLATING AND ROTARY AIR CONTROLLER FOR INTERNAL COMBUSTION ENGINES AND THE LIKE

Alois Skok and Noble O. Binley, Pasadena, Calif.

Application January 20, 1938, Serial No. 185,866

1 Claim. (Cl. 48—180)

Our invention relates to air controllers, which are of the automatic type and which may be used for controlling the influx of the air therethrough and into the cylinders of the internal combustion engines, by means of which a greater economy in fuel consumption may be attained and also, an increase of motive power may be secured and so maintained under all working conditions.

Manifestly, an object of our invention is to provide a device, which is placed in line of the air duct of the engine intake manifold and the carburetter, said device being so arranged whereby the air passage may be controlled and by admitting an additional volume of air when it may be necessary and required, thus causing the air to be mixed with the passing vaporized hydrocarbon fuel, allowing the combined gases to whirl, consequently causing said gases to become thoroughly disintegrated by breaking down the atomic structure thereof and by means of which a perfect combustion of gases, within the cylinders of the said engine, may be had.

Another object of our invention is to provide said device with a plurality of air passages, said passages being so arranged whereby the air or a volume of air passing therethrough may be controlled, so that only a desired amount of said air may enter into the engine cylinders, also, because of the particular position of the said air passages leading into the intake manifold the influx of the air causes and maintains a whirling effect therein, thus breaking down the atomic structure of the passing gases and consequently increases the volatility of the combustive hydrocarbons within the engine cylinders.

Further object of our invention is to provide a device with a plurality of air passages, said passages being so arranged whereby the air whirling effect may at all times lead into the manifold out of which the hydrocarbon gas mixture is drawn into the engine cylinders, also, said device having a suitable lever member which may be connected to a thermostat or other suitable device which will control the input of said air volume, so that a greater amount of air may pass therethrough when the engine is warm and therefore increasing the combustibility of the gases and consequently attaining a considerable saving in the gas consumption.

Another object of our invention is to provide said device in such a form, which may be easily adapted for the uses in diverting mixed gases or combustive fluids therefrom and in diversified volumes into a plurality of feed conduits, such as gas or fluid pipes or the like, and therefore providing a central control for the fluids leading out of the main supply.

Another object of our invention is to provide said device with a plurality of fluid passages, said passages being so arranged whereby their influx may be directed toward the center or an apex, also, having a suitable control collar member provided with grooves which are positioned at and enclosing the internal orifices of the said fluid passages, so that the passing volume of fluid may be gradually regulated allowing the fluid to pass into the central passage through the jets which are concentrically positioned in respect to the said apex, consequently allowing the passing volume of fluid to concentrate at a given point, leading toward the exhaust side or the discharge end of the said device, and also causing a whirling effect of the said gases or fluids, irrespective of the volume when passing therethrough and regulated by the said control collar member.

Another and further objects and advantages of our invention as will hereinafter more fully appear, we attain by the construction herein shown on the drawing and described in the specification, forming a part of our application.

Reference is had to the accompanying drawing in which the similar reference characters denote the similar parts.

In the drawing:

Fig. 1 shows the perspective view of the device, in position between the carburetter and the intake manifold of the internal combustion engine, also showing the controlling means associated therewith for controlling the supply of the air thereto.

Fig. 2 shows the fragmentary side elevational view of the device, taken in the direction of the arrow 2, on Fig. 1.

Fig. 3 is the vertical cross sectional view of the device, taken on the line 3—3 of the Fig. 2.

Fig. 4 is the top view of the device, taken on the line 4—4 of the Fig. 3.

Fig. 5 shows the fragmentary cross sectional view of the air passage, taken on the line 5—5 of the Fig. 4.

Describing our invention more in detail, said invention comprises a suitable gasket plate member, generally designated by numeral 2, which may be of any desired thickness or configuration, preferably however of heavy enough material in order to provide sufficient wall thickness for the air flues, so that, when positioned and fastened by means of the bolts 4, between the carburetter flange 6 and the manifold flange 8 it will allow a free passage of fluid or air, through the passages 10.

Said gasket plate member 2 comprises a body member 12 and a cover member 14, both having a central passage or opening 16 which is commensurate to the size of the intake manifold 8.

The said body member 12 is provided with a suitable central groove 18 wherein a circular valve ring member 20 is positioned having a lever member associated therewith and extending therefrom as at 22, and which is for the purpose to regulate its position within said groove 18, the operation of which will be presently described.

The valve ring member 20 is provided with a plurality of passages 23 which may, if so desired, be elongated or tapered to a point, as shown, see Fig. 4, in order for regulating the increase or decrease of the passage and thereby the influx of the air volume passing therethrough and when the said valve ring member 20 is in operation.

The body member 12, at the groove section 18 is provided with a plurality of passages 24, leading interiorly into the central passage 16 and which are so positioned, whereby their relative positions will intercept with the passages 23, as shown, including the air passages 10 which are positioned at the under-side of the said cover member 14 and which is held in place over the said body member 12 by means of a pair of suitable screws 26, as shown in Fig. 4.

It may be noted, that the openings or jets 24, may, if so desired, be angularly positioned, leading toward the center or the apex, in order to concentrate the flow of fluids, also, their relative positions are located at a tangent to the interior surface of the said opening 16, so that, when the air passes therethrough, the velocity created by the flow of said fluids will intercept the passing hydrocarbons or gas mixtures, causing considerable whirling of the mixed fluids and therefore causing disintegration and the breaking of the atomic structure of the gases, and, by moving the lever 22 the inlet passages may be so governed, whereby the passing volume, may, at will, be diminished or increased, or, as may be necessary or required in each individual instance.

In operation the lever 22 is provided with a suitable yoke 28 which is connected to a slitted control member 30 by means of a pin member 32, said control member 30 being pivotally mounted upon a racket member 34 as shown, see Fig. 1, and held therein by means of a pivot pin member 36.

Said yoke member 28 is provided with a rod 38 which is connected to the carburetter control lever 40, having a suitable feed rod member 42 attached thereto and connecting the feed lever 44 of the carburetter valve, which is provided with an extension 45, as shown.

Also, said feed lever 44 is connected to the thermostat lever 46 by means of a suitable connecting rod 48, so that, a uniform control of the control lever 40 and the thermostat lever 46 may be maintained, by controlling the position of the yoke 28, in allowing it to assume various positions within the said slit 50, thus either short or long strokes or movements of the control member 30 may be had; said movement is controlled by the accelerator rod member 52 which is connected to the pivot bracket member 54 and interconnecting the lever 45 by means of a suitable rod member 56 the fulcrum point of which is held in adjustable position by means of a fork member 58, as shown.

Obviously, it may be noted, that when raising the yoke 28 the pin 32 will assume a position close to the pivot point or pin 36 and thus shortening the pivotal movement of the levers 30 and 22 respectively, and thus controlling the openings 10 and 24 by means of the slot 23, which will allow only a limited amount of air or fluid to pass therethrough, during the operation of the engine. Also, it may be noted, that the device as herein shown and described may be used in modified form for automatically controlling the passage of the air in burners such as are used in gas heaters or the like, further, such device in modified form may be used very effectively for controlling the air passage or air feed to the combustion chambers of the Diesel engines, likewise, said device may be adapted for the use in controlling the passage of fluids from the main line into a number of feed lines in a suitable subterranean system, as in practice may be most desirable and advantageous, so that a complete control of the fluid feed lines or ducts may be had during an unexpected accident.

While we have thus described our invention with great particularity it will be clear that the same may be modified throughout a wide range. We accordingly do not propose to be limited to the exact details of construction herein shown and described but reserve the rights in practice to make the necessary changes and modifications which may come within the scope of the appended claim.

We claim as our invention:

In the apparatus of the class described adapted for guiding and for controlling the fluid flow into the cylinders of the internal combustion engine, having a carburetter and the intake manifold, a gasket plate means connected to and positioned between the said carburetter and said manifold having a central groove positioned therein and a central passage for connecting said carburetter and said manifold, a plurality of air passages connecting said central groove, diametrically opposed in their position and leading at a tangent through the said gasket plate means into said central passage for guiding and directing the air inflow therethrough, air flow controlling means slidably disposed within said groove having elongated and gradually tapered passages positioned therein for controlling the flow of fluid therethrough and into said central passage in diversified volume, a cover plate means associated with said gasket plate means and positioned over the said slidably disposed controlling means for preventing its binding when in place and having a plurality of fluid passages positioned therein for interconnecting the fluid passages in said controlling means and the said gasket plate means, and regulating lever member connected to said controlling means for regulating the position of the said elongated and gradually tapered passages over said fluid passages in said gasket means and for controlling the fluid flow therethrough, and into said central passage, so that the incoming fluid, in diversified volume, may pass and be mixed with the incoming hydrocarbon and for breaking down its atomic structure during the operation of the said internal combustion engine.

ALOIS SKOK.
NOBLE O. BINLEY.